United States Patent
Zeng et al.

(10) Patent No.: US 8,639,907 B2
(45) Date of Patent: Jan. 28, 2014

(54) METHOD AND APPARATUS FOR DYNAMICALLY ADJUSTING MEMORY CAPACITY IN ACCORDANCE WITH DATA STORAGE

(75) Inventors: Zhiqiang Zeng, Fremont, CA (US); Paul Tien, Fremont, CA (US); Wei Gao, Fremont, CA (US)

(73) Assignee: Netgear, Inc., San Jose, CA (US)

( * ) Notice: Subject to any disclaimer, the term of this patent is extended or adjusted under 35 U.S.C. 154(b) by 475 days.

(21) Appl. No.: 12/841,367

(22) Filed: Jul. 22, 2010

(65) Prior Publication Data
US 2012/0023291 A1 Jan. 26, 2012

(51) Int. Cl.
*G06F 12/00* (2006.01)
(52) U.S. Cl.
USPC ........... 711/173; 711/111; 711/114; 711/150; 711/154; 711/170
(58) Field of Classification Search
USPC ................. 711/111, 114, 150, 154, 170, 173
See application file for complete search history.

(56) References Cited

U.S. PATENT DOCUMENTS

| 7,685,378 B2 * | 3/2010 | Arakawa et al. ............... 711/154 |
| 8,176,247 B2 * | 5/2012 | Galloway et al. ............. 711/114 |

* cited by examiner

*Primary Examiner* — Midys Rojas
(74) *Attorney, Agent, or Firm* — James M. Wu; JW Law Group

(57) ABSTRACT

A storage apparatus and method configured to improve efficiency of data access utilizing dynamically adjusting storage zone boundary within a disk are disclosed. A process capable of implementing the flexible zone boundary, in one example, allocates a first zone of a first disk operable to store data. While the first zone can be referred to as a Redundant Array of Independent Disks 0 ("RAID 0") zone, the implementation of RAID 0 can be carried out in the first zone. Upon allocating a second zone of the first disk operable to store secured data, the process allocates a third zone of the first disk wherein the storage boundary of the first zone can be dynamically expanded into the third zone in response to the availability of free storage capacity of the first zone of the first disk.

16 Claims, 6 Drawing Sheets

METHOD AND APPARATUS FOR DYNAMICALLY ADJUSTING MEMORY CAPACITY IN ACCORDANCE WITH DATA STORAGE

FIELD

The exemplary embodiment(s) of the present invention relates to digital computing systems. More specifically, the exemplary embodiment(s) of the present invention relates to storage devices.

BACKGROUND

With increasing popularity of instant information over wired and/or wireless communications network, efficient and fault-tolerant storage devices able to store data, video, and audio information are in high demand. A conventional computer data storage layout, for example, may be organized as Redundant Array of Independent Disks ("RAID") configuration. RAID is a storage device using multiple hard drives or disks linked together to form a large capacity storage device. Storage layouts using various RAID configures have been widely deployed in online data centers, server farms, data computing machines, and/or consumer electronics.

Conventional RAID configurations provide several levels of storage schemes wherein each level offers one or more features, such as error tolerance, storage capacity, and/or storage performance. While the method of redundancy may depend on which version or level of RAID is deployed, and performance enhancement may be found when specific version of the RAID configuration is used. Note that RAID performance can also be dependent upon the number of drives used in the array and the controller. Typically, RAID layout includes seven (7) levels of storage configuration, namely from RAID 0 to RAID 6. In general, RAID 0 and RAID 1 are the popular versions of RAIDs used for conventional data storage.

RAID 0 includes one or more striped disk arrays wherein RAID 0 typically does not offer fault-tolerance. In one example, RAID 0 provides data striping which spreads a file over multiple blocks across several disks for performance improvement. The method of using striped disks is to increase input/output ("I/O") performance by splitting I/O transfer across multiple I/O interfaces for parallel accessing. A problem associated with RAID 0 is that if one disk fails, all data in the array may be lost.

RAID 1 provides fault-tolerance from disk errors by implementing disk mirroring which mirrors the contents of the disks. A shortcoming of RAID 1 is that it typically requires a minimum of two disks to implement RAID 1 storage configuration. RAID 2 employs Hamming error correction codes to address fault-tolerances. RAID 3 uses parity bits with a dedicated parity disk with byte-level striping storage configuration. While RAID 4 provides block-level striping (like Level 0) with a parity disk, RAID 5 provides byte level data striping as well as stripes error correction information. RAID 5 typically requests at least 3 drives to operate. RAID 6 offers block level striping wherein the parity bits are stored across multiple disks.

SUMMARY

A storage apparatus and method configured to improve efficiency of data storage using flexible zone boundaries are disclosed. A process capable of implementing the flexible zone boundary, in one embodiment, allocates a first zone of a first disk operable to store data. While the first zone can be referred to as a Redundant Array of Independent Disks 0 ("RAID 0") zone, the implementation of RAID 0 can be carried out in the first zone. Upon allocating a second zone of the first disk operable to store secured data, the process allocates a third zone of the first disk wherein the storage boundary of the first zone can be dynamically expanded into the third zone in response to the availability of free storage capacity of the first zone of the first disk.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
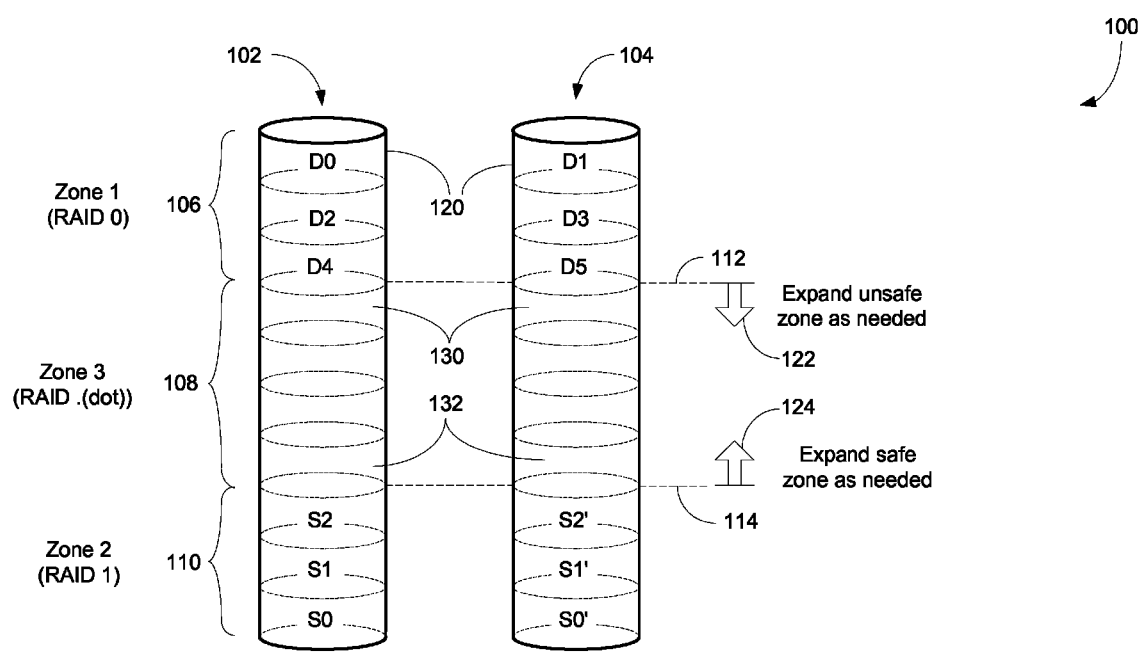
FIG. 1 is a block diagram illustrating a storage device capable of implementing flexible storage zone boundary in a storage disk in accordance with one embodiment of the present invention.

Exemplary embodiment(s) of the present invention is described herein in the context of a method, device, and apparatus for improving efficiency of data storage using flexible storage boundary of disks.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

It is understood that the embodiments of the present invention may contain transistor circuits that are readily manufacturable using well-known art, such as CMOS ("complementary metal-oxide semiconductor") technology, field programmable gate arrays ("FPGAs"), or other semiconductor manufacturing processes. In addition, the embodiments of present invention may be implemented with other manufacturing processes for making digital and/or analog devices.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

References to "one embodiment," "an embodiment," "example embodiment," "various embodiments," "exemplary embodiment," "one aspect," "an aspect," "exemplary aspect," "various aspects," et cetera, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

Embodiments of the present invention disclose a storage configuration capable of dynamically adjusting storage zone boundary within a disk to improve data storage efficiency for non-volatile data storage. A process capable of implementing the flexible zone boundary, in one example, allocates a first zone of a first disk operable to store data. While the first zone can be referred to as a Redundant Array of Independent Disks 0 ("RAID 0") zone, the implementation of RAID 0 can be carried out in the first zone. Upon allocating a second zone of the first disk operable to store secured data, the process allocates a third zone of the first disk wherein the storage boundary of the first zone can be dynamically expanded into the third zone in response to the availability of free storage capacity of the first zone of the first disk.

FIG. 1 is a block diagram 100 illustrating a storage device capable of implementing flexible storage zone boundary in a storage disk in accordance with one embodiment of the present invention. Diagram 100 is a disk or disc drive including two storage disks or discs 102-104. The term "disk" and "disc" are hereinafter used interchangeably. Disk storage is an electrical or optical data storage medium capable of digitally recording data over a recording layer disposed over a disc. The recording layer, for example, can be a magnetic or optical compound material whereby the data stored at the recording layer is non-volatile data. Note that the disk storage can be replaced with semiconductor memory integrated circuits ("ICs") and the flexible storage zone boundary is equally applicable to IC memory storage. It should be noted that the underlying concept of the exemplary embodiment(s) of the present invention would not change if one or more devices were added to or removed from diagram 100.

Disk 102, in one embodiment, is partitioned into multiple blocks 120 wherein blocks 120 are further grouped into three (3) portions or zones 106-110. Each block 120, for example, may be further partitioned into sub-blocks depending on applications as well as the storage capacity of each block. Similarly, disk 104 is also partitioned into multiple blocks 120 wherein blocks 120 are regrouped into three (3) portions or zones 106-110. Note that the underlying concept does not change if one or more portions or zones were added to disk 102 or 104.

Zone 1 or zone 106, which includes a flexible zone boundary 112, is configured to implement a particular disk storage configuration such as RAID 0 for data storage. Flexible zone boundary 112, in one embodiment, can expand or move into zone 3 or zone 108 as indicated by arrow 122 when zone 1 needs additional storage space. In one aspect, when the additional space is no longer needed, zone 1 retreats flexible zone boundary 112 back to original default zone boundary.

Zone 2 or zone 110, which includes a flexible zone boundary 114, is configured to implement a specific disk storage configuration such as RAID 1 for data storage. To dynamically adjust storage capacity, zone 2 is able to move its flexible zone boundary 114 into zone 3 as indicated by arrow 124 to obtain additional blocks for storage. If the additional space at zone 3 is no longer needed, zone 2 releases the additional space by moving flexible zone boundary 114 back to the original default zone boundary.

Zone 3 or zone 108 is a portion of disk space allocated for implementing flexible zone boundary. For example, a subportion of zone 3, such as a sub-block, a block, or multiple blocks, may be temporarily assigned to zone 1 or zone 2 in response to a zone boundary expansion request. The amount of disk space to be temporarily assigned per every request can be set by a default value, a user, or a network administrator. For example, upon receiving an expansion request from zone 1, a block 130 of zone 3 may be assigned to zone 1 so that flexible zone boundary 112 can logically expand one (1) block into zone 3. Block 132 of zone 3 may be assigned to zone 2 upon request and flexible zone boundary 114 is subsequently allowed to expand one (1) block into zone 3.

Referring back to FIG. 1, the drive including disks 102-104 is configured to implement RAID 0 in zone 106 and RAID 1 in zone 110 wherein the zone boundary for zones 106 and 110 can be dynamically expanded into zone 108 as needed. In one embodiment, RAID 0 operation in zone 106 provides data striping which spreads a file over multiple blocks D0-D5 across disks 102-104 for improving efficiency of data access. Since RAID 0 does not deliver fault-tolerance, the data stored at blocks D0-D5 is unsecured (or unsecured data) because when either disk 102 or disk 104 fails, stored data in the array may be lost. Zone 106 or zone 1 can also be considered as unsafe zone although RAID 0 provides faster data throughput.

RAID 1 operation in zone 110 or zone 2 provides fault-tolerance from disk errors by implementing disk mirroring wherein blocks S0'-S2' of disk 104 minor the contents of blocks S0-S2 of disk 102. Since RAID 1 delivers fault-tolerance, the data stored at blocks S0-S2 is secured data because when disk 102 fails, stored data at blocks S0-S2 can be recovered from blocks S0'-S2' of disk 104. Zone 110 or zone 2 is considered as safe zone although RAID 1 takes twice as memory space as RAID 0.

The data storage configuration illustrated in FIG. 1 is also known as RAID 0.1 which provides desirable security as well as flexible capacity depending on user applications. In one aspect, disks 102-104 are partitioned into three RAID zones 106-110 for implementing RAID 0 and RAID 1 storage operations. Zone 106 or RAID 0 zone, which performs RAID 0 operation, is used for maximum storage capacity for volume storage. Since RAID 0 offers limited error tolerance, RAID 0 storage configuration can be desirable to store non-critical data.

RAID. (dot) zone (or zone 108) is reserved storage space used for automatic and/or dynamic zone boundary expansion. Portion(s) of RAID. (dot) zone may be temporarily or permanently assigned or allocated to other zones for data storage. RAID 1 zone (or zone 110) is used to implement RAID 1 for storing critical or important data since the data stored at zone 110 is automatically backed up. Storage system, for example, may be preset to a default size or default boundary for each zone. For instance, while RAID 0 zone and RAID 1 are set to 20% of storage space of disk 102 for each zone, RAID. (dot) zone is set to 60% of the storage space of disk 102. When RAID 0 zone or RAID 1 zone approaches its maximum limit, storage device, in one embodiment, will automatically allow RAID 0 zone or RAID 1 zone to expand into RAID. (dot) zone.

An advantage of employing a storage device capable of implementing flexible zone boundary expansion is to implement multiple storage configurations such as RAID 0 and RAID 1 within one (1) drive. For example, a drive containing two (2) disks capable of performing RAID 0 and RAID 1 should provide better fit for user's specific usage patterns. Moving data between safe and un-safe zone while maximizing storage capacity offer greater flexibility for data storage. If disk 102 fails, data stored at blocks S0-S2 at RAID 1 zone (or zone 110) can be recovered from blocks S0'-S2' of disk 104.

During an operation, after configuring disks 102-104 to RAID 0.1, the storage device allocates a portion 106 of disks 102-104 as zone 1 used for implementing RAID 0 and allocates a second portion 110 as zone 2 used for implementing RAID 1. Blocks D0-D5 spread across disks 102-104 for data storage with multiple I/O interfaces for speedy data throughput. Blocks S0'-S2' mirror secured data stored at blocks S0-S2 whereby the data stored at blocks S0'-S2' can be used to recover data stored at block S0-S2 in the event that disk 102 fails. When zone 1 reaches the full or nearly full storage capacity at blocks D0-D5, zone 1 boundary 112 automatically expands its boundary into zone 3 as indicated by arrow 122 to obtain additional storage space at zone 3. Similarly, when zone 2 reaches its full or nearly full storage capacity at blocks S0-S2, zone 2 boundary 114 automatically expands its boundary into zone 3 as indicated by arrow 124 to obtain additional storage space. When the extra storage space at zone 3 is no longer needed, zone 1 or zone 2 releases the storage space back to zone 3 by restoring the zone 1 or 2 boundary back to the original default value.

Figure 2:
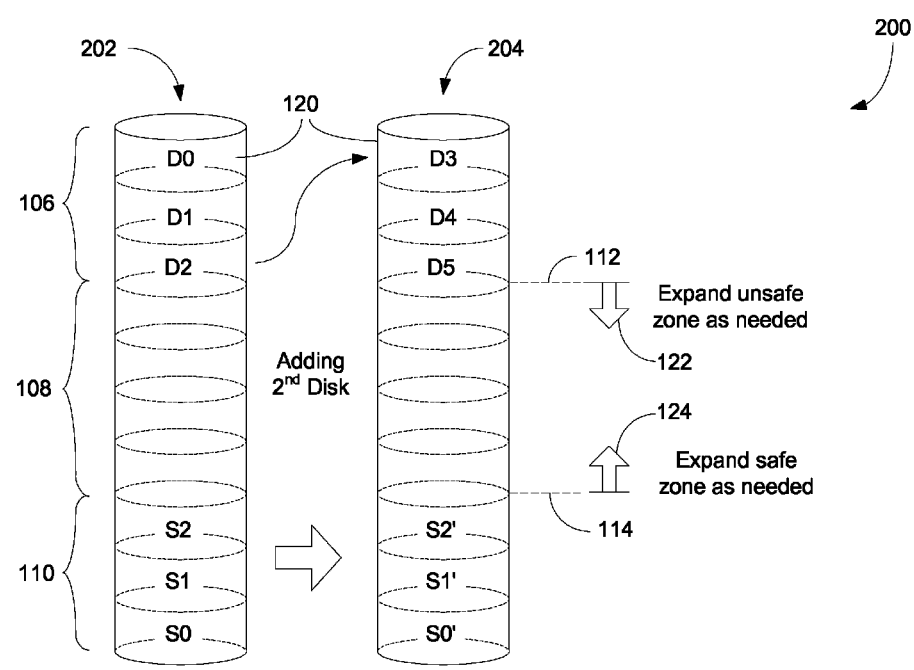
FIG. 2 is a block diagram illustrating a storage device capable of implementing flexible zone storage boundary in a storage disk operating JBOD storage configuration in accordance with one embodiment of the present invention.

FIG. 2 is a block diagram 200 illustrating a storage device capable of implementing flexible zone storage boundary in a storage disk operating JBOD storage configuration in accordance with one embodiment of the present invention. Diagram 200, in one aspect, is a disk drive including two storage disks 202-204. Disk 202, in one embodiment, is partitioned into multiple blocks 120 wherein blocks are further grouped into three (3) zones 106-110. Depending on applications, block 120 can be further partitioned into sub-blocks for data storage. Similarly, disk 204 is also partitioned into multiple blocks 120 wherein blocks are also grouped into three (3) zones 106-110. Note that the underlying concept does not change if one or more portions or zones were added to or removed from disks 202 or 204.

Zone 1 (or zone 106), which includes a flexible zone boundary 112, is configured to implement a specific disk storage configuration such as RAID 0. Flexible zone boundary 112, in one embodiment, can expand its boundary into zone 3 (or zone 108) as indicated by arrow 122 when zone 1 requests additional storage space. Zone 2 (or zone 110), which includes a flexible zone boundary 114, is configured to perform a specific disk storage configuration such as RAID 1. Flexible zone boundary 114, in one embodiment, is capable of expanding its boundary into zone 3 as indicated by arrow 124 to enlarge its storage capacity when zone 2 needs additional storage space. When the additional space is no longer needed, flexible zone boundary 112 or 114 retreats back to the predefined default boundary.

Zone 3 (or zone 108) is a portion of disk space allocated for implementing the feature(s) of flexible zone boundary. A sub-portion of zone 3, such as a sub-block, a block, or multiple blocks, may be temporarily assigned to zone 1 or zone 2 in response to a zone boundary expansion request. Zone 3, in one embodiment, provides additional storage space to zone 1 and/or zone 2 for facilitating dynamically boundary adjustments.

Referring back to FIG. 2, the drive including disks 202-204 is configured to implement JBOD in zone 106 and RAID 1 in zone 110 wherein the zone boundaries can be dynamically adjusted in response to the demand(s) or request(s). JBOD is an acronym for "Just a Bunch Of Disks" or "Just a Bunch Of Drives" referring to a collection of disks partitioned into various logical blocks for data storage. Each disk or block within JBOD may be independently addressed or be mapped to a different logical volume. Alternatively, JBOD refers to a storage scheme of all disks that are logically concatenated as a single large disk. JBOD offers large storage capacity with high data throughput. Since JBOD does not offer fault-tolerance, the data stored at blocks D0-D5 of disks 202-204 is not secured because if one of disks 202-204 fails, stored data at blocks D0-D5 may be lost.

RAID 1 operation in zone 2 (or zone 110) provides fault-tolerance from disk errors by implementing disk mirroring technique wherein blocks S0'-S2' of disk 204 minor the contents of blocks S0-S2 of disk 202. Since RAID 1 delivers fault-tolerance, the data stored at blocks S0-S2 is secured because when disk 202 fails, stored data at blocks S0-S2 can be recovered from blocks S0'-S2' of disk 204. Zone 110 (or zone 2) is considered as safe zone although RAID 1 takes twice as memory space as JBOD.

During an operation, after configuring disks 202-204 of the drive to JBOD and RAID 1, the storage device allocates a portion 106 of disks 202-204 as zone 1 used for implementing JBOD and allocates a second portion 110 as zone 2 used for implementing RAID 1. Blocks D0-D5, configured to perform JBOD with a concatenation approach, spread across disks 202-204 for data storage with multiple I/O interfaces for improving data throughput. Blocks S0'-S2' mirror secured data stored at blocks S0-S2 whereby the data stored at blocks S0'-S2' may be used to recover data stored at block S0-S2 in the event that disk 102 fails. When zone 1 reaches full or almost full storage capacity at blocks D0-D5, zone 1 boundary 112 automatically expands its boundary into zone 3 as indicated by arrow 122 to obtain additional storage space. Similarly, when zone 2 reaches its full or almost full storage capacity at blocks S0-S2, boundary 114 automatically expands its boundary into zone 3 as indicated by arrow 124 to obtain additional storage space. When the extra storage space obtained from zone 3 is no longer needed, the extra storage space, in one embodiment, is released back to zone 3 by moving the zone boundary or boundaries back to the original default place.

Diagram 200 illustrates a drive having two (2) disks capable of implementing RAID or JBOD storage configuration. If, for example, the drive is configured as 2-disk RAID 0 and/or JBOD, the drive provides no security for entire storage even though it may achieve the largest storage space. If, on the other hand, the drive is configured as 2-disk RAID 1, the drive does not provide space gain although it achieves high security. Alternatively, if the drive is configured to perform JBOD and/or RAID 1 with partitioned disk zones, a user can pick and choose where to store the data based on the nature of the data.

Figure 3:
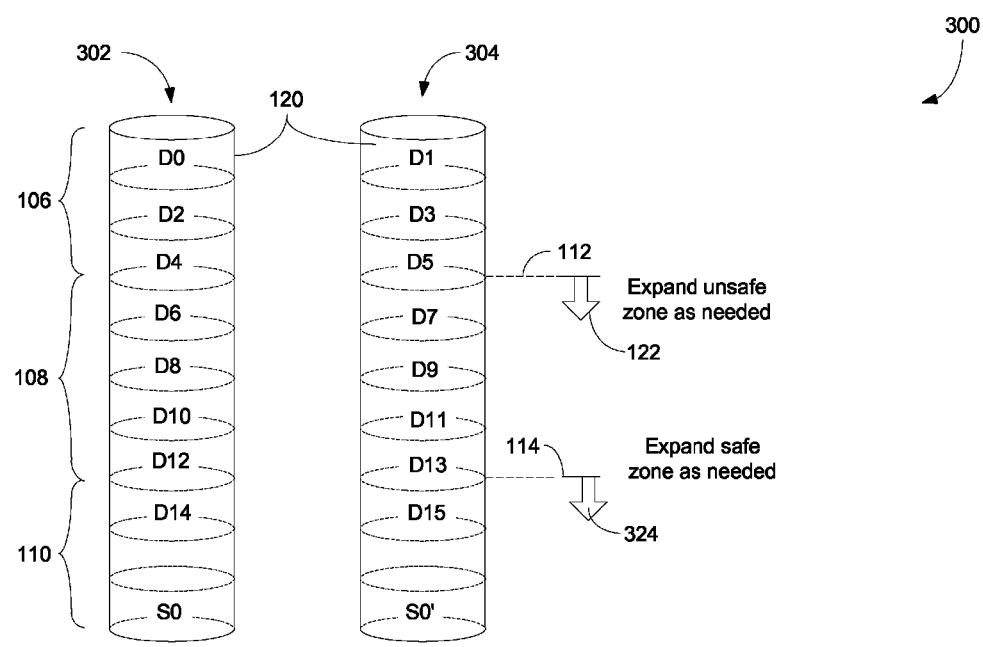
FIG. 3 is a block diagram illustrating an exemplary storage device configured to allow a storage boundary in a disc to expand across multiple storage zones in accordance with one embodiment of the present invention.

FIG. 3 is a block diagram 300 illustrating an exemplary storage device configured to allow a storage boundary in a disc to expand across multiple storage zones in accordance with one embodiment of the present invention. Diagram 300, in one aspect, is a disk drive including two storage disks 302-304. Disks 302-304 are partitioned into multiple blocks 120 wherein blocks are further regrouped into three (3) zones 106-110. Note that the underlying concept does not change if one or more portions or zones were added to disks 302 or 304.

Zone 1 (or zone 106) having a flexible zone boundary 112 is configured to implement a specific disk storage configuration such as RAID 0 or RAID 1. Flexible zone boundary 112, in one embodiment, can expand its boundary into zone 3 (or zone 108) as indicated by arrow 122 when zone 1 requests additional storage space. Zone 2 (or zone 110) having a flexible zone boundary 114 is configured to perform a specific disk storage configuration such as RAID 1. Zone 3 (or zone 108) is a portion of disk space allocated for implementing flexible zone boundary. A sub-portion of zone 3, such as a sub-block, a block, or multiple blocks, may be temporarily assigned to zone 1 or zone 2 in response to an expansion request. Note that expansion request can be issued by zone 1 or zone 2. Zone 3 provides additional storage space to zone 1 and/or zone 2 for facilitating zone boundary adjustments. In one embodiment, storage device allows a zone to expand its storage capacity into multiple zones.

Referring back to FIG. 3, the drive including disks 302-304 is configured to implement RAID 0 in zone 106 and RAID 1 in zone 110. The zone boundaries for zones 106 and 110 can be dynamically expanded into zone 108 as needed. RAID 0 storage operations in zone 106 provide data striping which spreads a file over multiple blocks D0-D15 across disks 302-304 for improving storage efficiency.

RAID 1 operation in zone 110 provides fault-tolerance from disk errors by implementing disk mirroring technique wherein block S0' of disk 304 mirror the contents of block S0 of disk 302. Since RAID 1 delivers fault-tolerance, the data stored at block S0 is secured (or secured data) because when disk 302 fails, stored data at block S0 can be recovered from block S0' of disk 304. Zone 110 is considered as safe zone although RAID 1 requests twice the memory space as RAID 0.

In one embodiment, storage device allows a zone boundary to expand across multiple zones. When zone 106 obtains storage space of entire zone 108 through its boundary expansion, the boundary of zone 106 can continue to expand into zone 110 if it has free storage space. For example, when RAID 0 storage configuration has used up blocks d0-d5 at zone 106, it expands its storage capacity into zone 108 by moving its zone boundary 112 into zone 108 as indicated by arrow 122. Upon using up blocks D6-D13 at zone 3, RAID 0 storage configuration continues to expand the storage capacity into zone 2 and stores data in blocks D14-15 as indicated by arrow 324. The storage device may issue a storage full flag when the drive is completely full or almost full.

Diagram 300 illustrates a drive having two (2) disks capable of implementing RAID storage configuration(s). Embodiment(s) of the present invention is also applicable to more than two (2) disk RAID systems.

Figure 4:
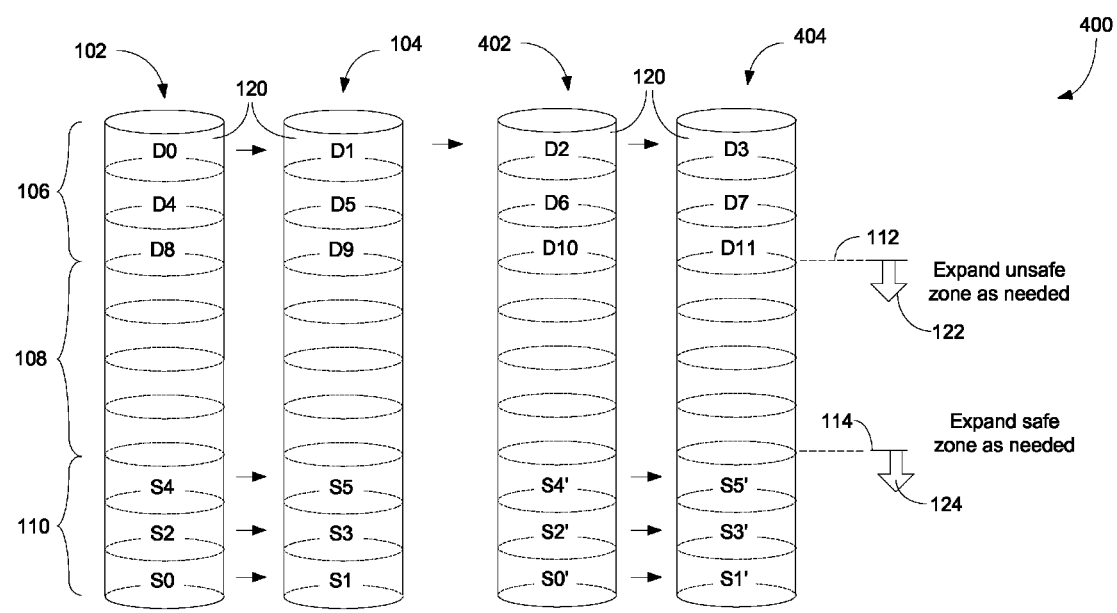
FIG. 4 is a block diagram illustrating an exemplary storage device capable of implementing flexible storage boundary for disks implementing RAID 0 and RAID 1 configurations in accordance with one embodiment of the present invention.

FIG. 4 is a block diagram 400 illustrating an exemplary storage device capable of implementing flexible storage boundary for disks implementing RAID 0 and RAID 1 storage configurations in accordance with one embodiment of the present invention. Diagram 400, in one aspect, is a disk drive including four (4) storage disks 102-104 and 402-404. Disks 402-404 include similar characteristics of disks 102-104 as described earlier. Disks 402-404 are partitioned into multiple blocks 120 wherein blocks are further grouped into three (3) zones 106-110. Each block 120, for example, may be further partitioned into sub-blocks depending on applications. Note that the underlying concept does not change if one or more zones were added to or removed from disks 102-104 and/or 402-404.

Zone 1 having a flexible zone boundary 112 is configured to a specific disk storage configuration for performing storage functions. Flexible zone boundary 112, in one embodiment, is capable of expanding into zone 3 as indicated by arrow 122 when additional storage space is requested by zone 1. Similarly, zone 2 having a flexible zone boundary 114 is configured to a specific disk storage configuration for data storage. Flexible zone boundary 114, in one embodiment, is capable of expanding into zone 3 or zone 108 as indicated by arrow 124 when additional storage space is needed by zone 2. Zone 3 is a portion of disk space allocated for implementing flexible zone boundary.

Referring back to FIG. 4, the drive including disks 102-104 and 402-404 is configured to implement RAID 0 in zone 106 and RAID 1 in zone 110. The zone boundaries of zones 106 and 110 can dynamically expand into zone 108 as needed. In one embodiment, RAID 0 operation in zone 106 provides data striping which spreads a file over multiple blocks D0-D11 across disks 102-104 and 402-404 for improving efficiency of data access. Since RAID 0 does not deliver fault-tolerance, the data stored at blocks D0-D11 is not secured because when any of disks 102-104 and 402-404 fails, data stored at blocks D0-D11 may be lost.

In one embodiment, RAID 0 and RAID 1 ("RAID 0 and 1") operations are performed in zone 110 (or zone 2) across disks 102-104 and 402-404. Zone 2 of disks 102-104 provides RAID 0 operations while zone 2 of disks 402-404 provides RAID 1 with content mirroring operations. RAID 0 and 1 provides fault-tolerance from disk errors by implementing disk mirroring technique wherein blocks S0'-S5' of disks 402-404 minor the contents of blocks S0-S5 of disks 102-104. Since RAID 1 delivers fault-tolerance, the data stored at blocks S0-S5 is secured because if disk 102 or 104 fails, stored data at blocks S0-S5 can be recovered from blocks S0'-S5' of disks 402-404.

It should be noted that additional disks can be added to the drive illustrated in FIG. 4, and additional zones can be created to perform more than two (2) RAID storage configurations, such as RAID 0, RAID 1, RAID 5, and so forth.

Figure 5:
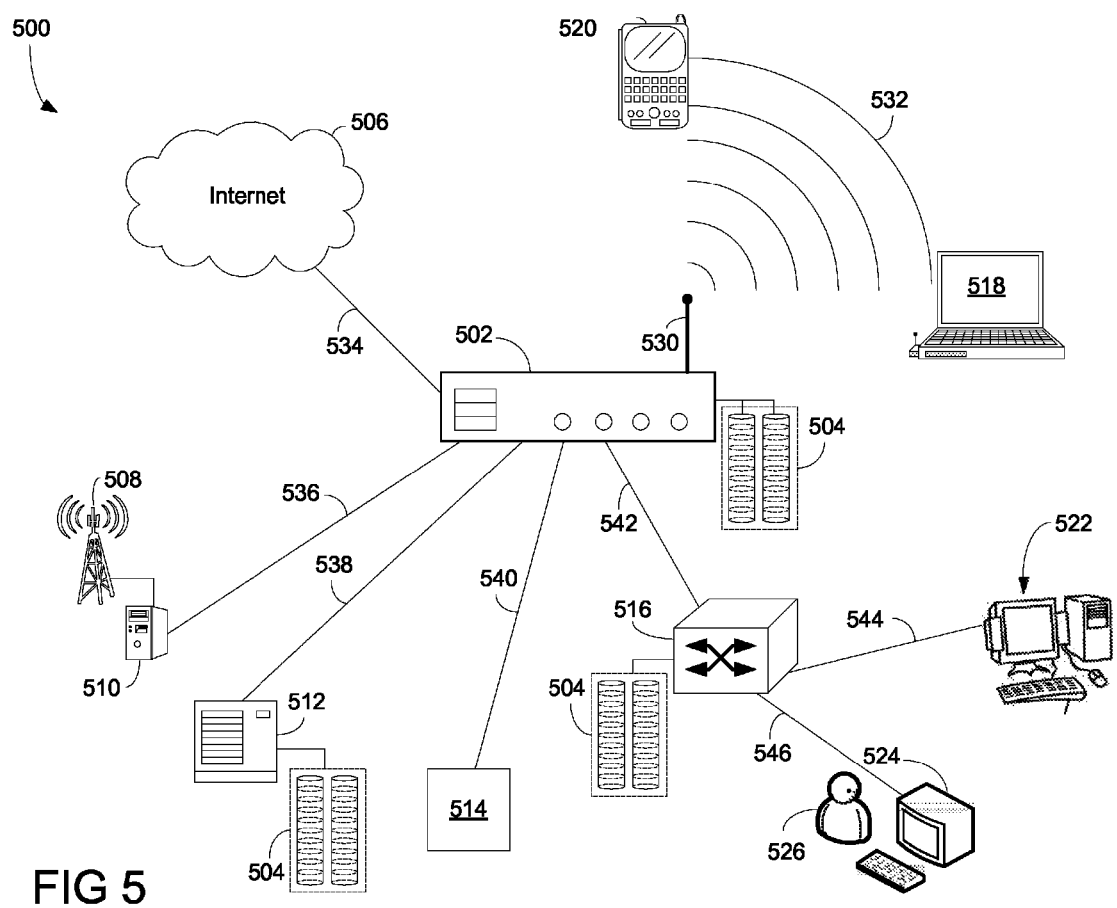
FIG. 5 is a block diagram illustrating a communications network having various network devices capable of implementing flexible storage boundary in accordance with one embodiment of the present invention.

FIG. 5 is a block diagram 500 illustrating a communications network having various network devices capable of implementing flexible zone boundary for data storage in accordance with one embodiment of the present invention. Diagram 500 includes an access device 502, Node B 508, online storage server 512, router 516, Internet 506, and wireless devices 518-520. Access device 502, in one example, can be a network switch, simple router, wireless gateway, hub, bridge, or the like. In one embodiment, access device 502 includes a storage drive 504 capable of implementing flexible zone boundary for data storage. It should be noted that the underlying concept of the exemplary embodiment(s) of the present invention would not change if one or more devices were added to or removed from diagram 500.

Access device 502 is coupled to Internet 506, Node B 508, online storage server 512, router 516, portable device 520, computer 518, modem 514 via wired and/or wireless connections 532-542 for packets switching and/or forwarding. Router 516 is further coupled with server 522 and an administrator 526 via connections 544-546. In one aspect, online storage server 512 and router 516 include storage devices 504 capable of implementing flexible zone boundary of disks which is able to dynamically adjust storage capacities to optimize the memory efficiency. It should be noted that storage device 504 can be used by other digital processing devices, such as Node B, computer 518, server 522, modem 514, et cetera.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
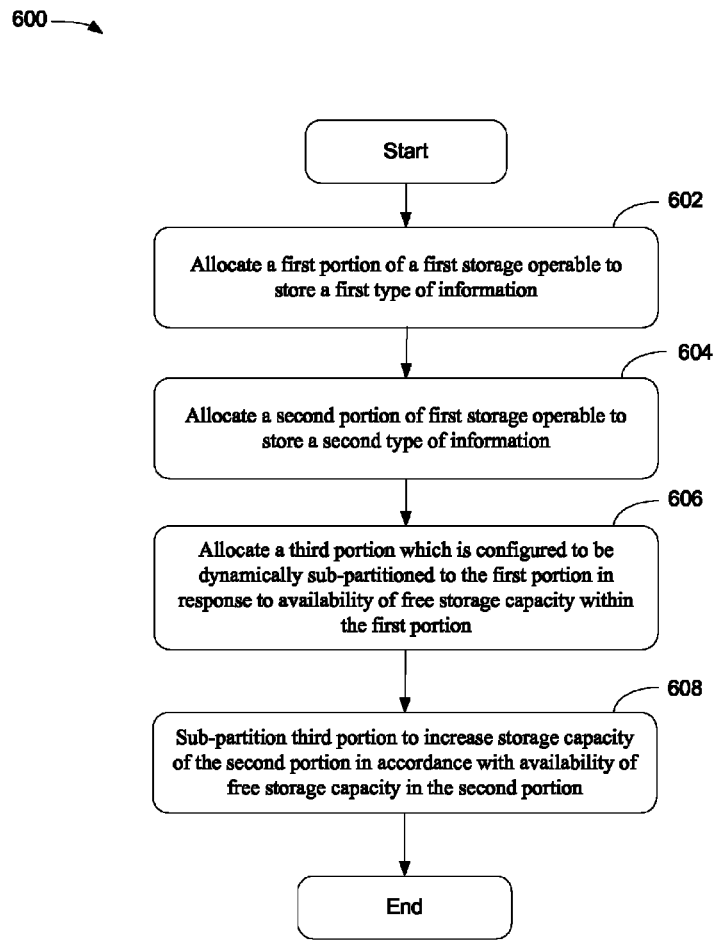
FIG. 6 is a flowchart illustrating a process of providing flexible storage boundary within disks for data storage in accordance with one embodiment of the present invention.

FIG. 6 is a flowchart illustrating a process of providing flexible zone storage boundary within disks for data storage in accordance with one embodiment of the present invention. At block 602, a process for data storage allocates a first portion of a first storage operable to store a first type of information. The first portion of a first storage, in one example, is zone 1 of a disk wherein zone 1 is able to hold the first type of information such as unsecured data. RAID 0 is, in one aspect, implemented in zone 1.

At block 604, the process allocates a second portion of the first storage operable to store a second type of information. The second portion of a first storage, in one example, can be zone 2 of the disk wherein zone 1 is able to hold the second type of information such as secured data. In one embodiment, RAID 1 is implemented in zone 2.

At block 606, the process allocates a third portion of the first storage which is configured to be dynamically sub-partitioned wherein the sub-partitioned portion can be assigned to the first portion of the first storage in response to availability of free storage capacity within the first portion of the first storage. The third portion is zone 3 which is free storage space that can be dynamically assigned to other zones in accordance with requests.

At block 608, the process sub-partitions the third portion of the first storage to increase storage capacity of the second portion of the first storage in accordance with availability of free storage capacity in the second portion of the first storage. Upon allocating a first portion of a second storage operable to store the first type of information, the process accesses the first portion of the first storage and the first portion of the second storage simultaneously to improve access speed. In one embodiment, a storage operation of RAID 0 functions is emulated at zone 1 or first portion. The process allocates a second portion of the second storage operable to replicate the same data stored in the second portion of the first storage for enhancing fault-tolerance. For example, a storage operation of RAID 1 function is performed or emulated in zone 2 for enhancing fault-tolerance. The process is also capable of allocating a third portion of the second storage which can be assigned to the first portion of the second storage in response to the availability of free storage capacity of the first portion of the second storage. The third portion of the second storage can be further sub-partitioned to increase storage capacity of the second portion of the second storage in accordance with availability of free storage capacity in the second portion of the second storage. The process, in one example, allocates a first portion of the second storage operable to expand storage capacity for the first portion of the first storage.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for data storage, comprising:
    allocating a first portion of a first storage operable to store a first type of information;
    allocating a second portion of the first storage operable to store a second type of information;
    allocating a third portion of the first storage configured to be dynamically sub-partitioned to the first portion of the first storage in response to availability of free storage capacity within the first portion of the first storage;
    allocating a first portion of a second storage operable in concert with the first portion of the first storage for enhancing data accessing;
    allocating a second portion of the second storage operable to store same data stored in the second portion of the first storage;
    allocating a third portion of the second storage operable to be dynamically sub-partitioned to the first portion of the second storage when available free space in the first portion of the second storage is low;
    sub-partitioning the third portion of the second storage to the second portion of the second storage when available free space in the second portion of the second storage is low; and
    sub-partitioning the third portion of the first storage to the second portion of the first storage in response to low free storage capacity in the second portion of the first storage.

2. The method of claim 1, further comprising:
    accessing the first portion of the first storage and the first portion of the second storage substantial simultaneously to improve access speed for the first type of information.

3. The method of claim 2, wherein accessing the first portion of the first storage and the first portion of the second storage substantial simultaneously to improve access speed for the first type of information includes emulating a storage operation of Redundant Array of Independent Disks 0 ("RAID 0") functions.

4. The method of claim 2, further comprising allocating a second portion of the second storage operable to replicate same data stored in the second portion of the first storage for enhancing fault-tolerance.

5. The method of claim 4, wherein allocating a second portion of the second storage operable to replicate same data stored in the second portion of the first storage for enhancing fault-tolerance includes emulating a storage operation of Redundant Array of Independent Disks 1 ("RAID 1") functions.

6. The method of claim 5, further comprising allocating a third portion of the second storage configured to be dynamically sub-partitioned to the first portion of the second storage in response to availability of free storage capacity within the first portion of the second storage.

7. The method of claim 6, further comprising sub-partitioning the third portion of the second storage to increase storage capacity of the second portion of the second storage in accordance with availability of free storage capacity in the second portion of the second storage.

8. A method for partitioning a storage device, comprising:
allocating a first portion of a first disk configured to store data;
allocating a second portion of the first disk configured to store secured data;
allocating a third portion of the first disk operable to be dynamically sub-partitioned to allocate additional storage capacity to the first portion of the first disk in response to low availability of free storage space in the first portion of the first disk;
allocating a first portion of a second disk configured to provide additional storage capacity to the first portion of the first disk for storing data;
allocating a second portion of the second disk configured to mirror same secured data stored in the second portion of the first disk;
allocating a third portion of the second disk and permitting boundary of the first portion of the second disk to dynamically extend into the third portion of the second disk when available free space in the first portion of the second disk is low;
allowing boundary of the second portion of the second disk to extend into the third portion of the second disk when available free space in the second portion of the second disk is low; and
allowing boundary of the second portion of the first disk to extend into the third portion of the first disk when available free space in the second portion of the first disk is low.

9. The method of claim 8, wherein allocating a third portion of the second disk includes sub-partitioning to allocate additional storage capacity to the first portion of the second disk in response to low free storage space in the first portion of the second disk.

10. The method of claim 9, further comprising:
partitioning a section of the third portion of the first disk to increase additional storage capacity of the second portion of the first disk in accordance with low free storage capacity in the second portion of the first disk; and
partitioning a section of the third portion of the second disk to increase additional storage capacity of the second portion of the second disk in accordance with low free storage capacity in the second portion of the second disk.

11. The method of claim 10, further comprising accessing the first portion of the first disk and the first portion of the second disk substantial simultaneously to improve data access speed.

12. The method of claim 11, wherein accessing the first portion of the first disk and the first portion of the second disk substantial simultaneously further includes emulating a storage operation of Redundant Array of Independent Disks 0 ("RAID 0") functions.

13. The method of claim 12, wherein allocating a second portion of the second disk configured to mirror same secured data stored in the second portion of the first disk includes enhancing fault-tolerance and emulating a storage operation of RAID 1 functions.

14. A storage device, comprising:
a first storage disk partitioned into a first region, a second region, and a third region, wherein the first region of the first storage disk stores unsecured data and the third region of the first storage disk stores secured data, wherein boundary of the first region of the first storage disk dynamically extends into the second region of the first storage disk when available free space in the first region of the first storage disk is low; and
a second storage disk partitioned into a first region, a second region, and a third region, wherein the first region of the second storage disk is operable in concert with the first region of the first storage disk to improve efficiency of data access, wherein the third region of the second storage disk replicates same secured data stored in the third region of the first storage disk;
wherein boundary of the first region of the second storage disk dynamically extends into the second region of the second storage disk when available free space in the first region of the second storage disk is low;
wherein boundary of the third region of the second storage disk dynamically extends into the second region of the second storage disk when available free space in the third region of the second storage disk is low;
wherein boundary of the third region of the first storage disk dynamically extends into the second region of the first storage disk when available free space in the third region of the first storage disk is low.

15. The storage device of claim 14, wherein the first region of the second storage disk is operable in concert with the first region of the first storage disk includes the first region of the first storage disk and the first region of the second storage disk are accessed substantially simultaneous to increase bandwidth of data throughput.

16. The storage device of claim 14, wherein the secured data stored in the second region of the second storage disk is retrieved to restore the secured data when the second region of the first storage disk fails.

* * * * *